(12) United States Patent
Demeulenaere et al.

(10) Patent No.: US 10,385,803 B2
(45) Date of Patent: Aug. 20, 2019

(54) SHAFT ASSEMBLY

(71) Applicant: Ford Global Technologies, LLC, Dearborn, MI (US)

(72) Inventors: Xavier Demeulenaere, London (GB); Mark Michel, Dartford (GB)

(73) Assignee: Ford Global Technologies, LLC, Dearborn, MI (US)

(*) Notice: Subject to any disclaimer, the term of this patent is extended or adjusted under 35 U.S.C. 154(b) by 603 days.

(21) Appl. No.: 15/188,850

(22) Filed: Jun. 21, 2016

(65) Prior Publication Data
US 2017/0002766 A1 Jan. 5, 2017

(30) Foreign Application Priority Data

Jun. 30, 2015 (GB) .................................. 1511413.5

(51) Int. Cl.
*F02F 7/00* (2006.01)
*F16C 35/02* (2006.01)
(Continued)

(52) U.S. Cl.
CPC .......... *F02F 7/0053* (2013.01); *F02F 7/0095* (2013.01); *F16C 9/02* (2013.01); *F16C 35/02* (2013.01); *F16C 35/047* (2013.01); *F16C 35/10* (2013.01); *F16C 35/12* (2013.01); *F01L 2001/0476* (2013.01); *F16C 2326/06* (2013.01)

(58) Field of Classification Search
CPC .......... F02F 7/0053; F02F 7/0095; F16C 9/02; F16C 35/047; F16C 35/12; F16C 35/02; F16C 35/10; F16C 2326/06; F01L 2001/0476
See application file for complete search history.

(56) References Cited

U.S. PATENT DOCUMENTS

| 2,560,413 A | 7/1951 | Carlson |
| 4,854,746 A | 8/1989 | Baugh et al. |
| (Continued) | | |

FOREIGN PATENT DOCUMENTS

| GB | 1496557 | 12/1977 |
| JP | H08312312 A | 11/1996 |
| WO | 20140168065 A1 | 10/2014 |

OTHER PUBLICATIONS

Examination Report of Great Britain Patent Application No. 1511413.5, dated Dec. 10, 2015, 7 pages, United Kingdom Intellectual Property Office.

*Primary Examiner* — Ryan J. Walters
(74) *Attorney, Agent, or Firm* — Julia Voutyras; McCoy Russell LLP

(57) ABSTRACT

A shaft assembly may include two or more Poka-Yoke bearing caps, each Poka-Yoke bearing cap having a pair of reference bores offset from a central axis of the bearing cap by differing offset distances, and each bearing cap defining a semi-circular recess that is positioned so as to align in use a central axis of the semi-cylindrical recess in the bearing cap with an axis of rotation of a shaft rotatably supported by the bearing cap. The differing offsets of the reference bores prevent the bearing cap from being assembled in a reversed orientation. To ensure that each bearing cap can only be fitted in one position, a center spacing between the first and second reference bores of each bearing cap is different to the center spacing used for other bearing caps used to support a single shaft.

5 Claims, 8 Drawing Sheets

(51) Int. Cl.
  *F16C 35/10* (2006.01)
  *F16C 35/04* (2006.01)
  *F16C 35/12* (2006.01)
  *F16C 9/02* (2006.01)
  *F01L 1/047* (2006.01)

(56) References Cited

U.S. PATENT DOCUMENTS

| | | |
|---|---|---|
| 5,119,776 A | 6/1992 | Bakker |
| 5,564,837 A * | 10/1996 | Putnam ................ F02F 7/0053 123/195 R |
| 6,086,258 A | 7/2000 | Cadle et al. |
| 2009/0046962 A1 | 2/2009 | Kociba et al. |
| 2015/0055902 A1 | 2/2015 | Draxler et al. |

* cited by examiner

SHAFT ASSEMBLY

CROSS REFERENCE TO RELATED APPLICATION

This application claims priority to Great Britain Patent Application No. 1511413.5, filed Jun. 30, 2015, the entire contents of which are hereby incorporated by reference for all purposes.

FIELD

This invention relates to rotatably supporting a shaft and, in particular, to a Poka-Yoke bearing cap forming part of a shaft assembly.

BACKGROUND/SUMMARY

It is well known to support a shaft using a split bearing support having two parts defining a bore in which is rotatably supported the shaft.

The assembly of rotating shafts requires split bearing supports with bores that provide very good positional tolerance, cylindricity and concentricity irrespective of the type of bearing used.

The required accuracy is best met if the split bearing supports are line bored together, that is to say, all concentric bores are machined in one operation with all parts in position.

In order to meet functional requirements, it is important that the bearing caps that form one half of the split bearing supports are re-assembled exactly in the same position during engine assembly or during any subsequent engine servicing.

Various methods have previously been used to ensure each bearing cap goes back in its original position during assembly but these methods do not necessarily prevent mistakes occurring during assembly of the bearing caps. For example, markings can be applied to each bearing cap by printing, engraving or casting to help the assembly operator to replace the bearing caps correctly.

Such markings have a number of disadvantages, for example, printed or engraved markings lead to increased piece price and cast marking fades and becomes less legible as the casting tool wears out.

For all markings, they provide guidance to the operator but do not prevent mistakes in assembly as the bearing caps can still be assembled the wrong way round or in the wrong position.

In order to try to overcome such problems it is known from U.S. Pat. No. 4,854,746 to provide a bearing cap that is flanked by first and second shoulders which are asymmetrical in shape and so prevent the bearing cap being wrongly positioned in a recess defined by precision machined guide surfaces formed in a bearing support member when a shaft to be supported is in position.

Although such an arrangement solves some of the problems associated with marking of the bearing caps it is only appropriate where a precision machined recess is formed in the bearing support member. The production of such a precision machined surface is expensive and time consuming to produce.

It is an object of the invention to provide a bearing cap that is simple and cost effective to produce but is so configured as to prevent the bearing cap from being assembled in an incorrect orientation.

It is a further object of the invention to provide a shaft assembly having two or more bearing caps that cannot be assembled in the wrong position.

According to a first aspect of the invention there is provided a shaft assembly comprising a shaft rotatably supported for rotation about an axis of rotation by at least two bearing support assemblies, each bearing support assembly comprising a bearing support structure defining first and second reference bores and a first semi-cylindrical recess having a central axis, each bearing support assembly further comprising a bearing cap having first and second feet joined by a bridge portion that defines a second semi-cylindrical recess for supporting the shaft, the first foot of the bearing cap having a first reference bore formed therein for accommodating in use a first location dowel and the second foot of the bearing cap having a second reference bore formed therein for accommodating in use a second location dowel, the first reference bore of the bearing cap being offset from a central axis of the second semi-cylindrical recess by a first distance and the second reference bore of the bearing cap being offset from the central axis of the second semi-cylindrical recess by a second distance that is different to the first distance, each bearing cap being fastened to the bearing support structure by a pair of bolts and by the first and second location dowels engaged with the first and second reference bores in the bearing support structure and the first and second reference bores in the bearing cap so as to align the two reference bores in the bearing support structure with the two reference bores in the bearing cap so that, in use, the central axes of the first and second semi-cylindrical recesses in the bearing support structure and the attached bearing cap are both coaxially aligned with the axis of rotation of the shaft, wherein each bearing support assembly has a centre spacing between the aligned reference bores that is different to the centre spacing of any other bearing support assembly used to support the shaft.

The first foot of each bearing cap may have a first clearance bolt hole extending therethrough for accommodating a first bolt used to secure the bearing cap in use to a corresponding bearing support structure and the second foot of each bearing cap may have a second clearance bolt hole extending therethrough for accommodating a second bolt used to secure the bearing cap in use to the bearing support structure, the first reference bore of each bearing cap may be formed in a mating face of the first foot that abuts in use against a first complementary face on the bearing support structure and the second reference bore of each bearing cap may be formed in a mating face of the second foot that abuts in use against a second complementary face on the bearing support structure.

The first reference bore of each bearing cap and the first clearance bolt hole of each bearing cap may be coaxially aligned and the second reference bore of each bearing cap and second clearance bolt hole of each bearing cap may be coaxially aligned.

For each bearing cap, the mating face of the first foot and the mating face of the second foot may both lie on a common plane and the first and second distances may be measurements from the central axis of the second semi-cylindrical recess along the common plane.

For each bearing cap, the first distance may be a measurement of the distance of a central axis of the first reference bore of the bearing cap from the central axis of the second semi-cylindrical recess and the second distance may be a measurement of the distance of a central axis of the second reference bore of the bearing cap from the central axis of the second semi-cylindrical recess.

The semi-cylindrical recesses of the bearing support structure and the bearing cap of each bearing support assembly may co-operate in use to support a bearing for the shaft.

The bearing may be one of a roller bearing, a ball bearing and a plain bearing. Each bearing support structure may be formed as part of a structural part of an engine.

The first foot of each bearing cap may have first and second clearance bolt holes extending therethrough for accommodating first and second bolts used to secure the bearing cap in use to the bearing support structure, and the second foot of each bearing cap may have third and fourth clearance bolt holes extending therethrough for accommodating third and fourth bolts used to secure the bearing cap in use to the bearing support structure.

The first and second clearance bolt holes may be offset from the first reference bore of the first foot of the bearing cap, and the third and fourth clearance bolt holes may be offset from the second reference bore of the second foot of the bearing cap.

According to a second aspect of the invention there is provided an engine having at least one shaft assembly constructed in accordance with said first aspect of the invention. The engine may further comprise a cylinder block and a ladderframe bolted to a lower end of the cylinder block, wherein the ladderframe defines a bearing support structure of each bearing support assembly.

The shaft may be one of a crankshaft, a camshaft and a balancer shaft of the engine. The shaft assembly may have exactly one shaft, and each bearing cap may have exactly one semi-circular recess for supporting the one shaft. Further, each bearing cap may have exactly two feet.

According to a third aspect of the invention there is provided a method of producing a shaft assembly constructed in accordance with said first aspect of the invention, the method comprising manufacturing a shaft, manufacturing a component having at least two bearing support structures each of which has a semi-circular recess and first and second reference bores and two or more threaded bores, manufacturing a like number of bearing caps as there are bearing support structures, each of the bearing caps having a semi-circular recess, first and second reference bores, and two or more bolt clearance holes, wherein the method further comprises machining the two reference bores in each bearing cap so that the first reference bore is offset from a central axis of the respective semi-cylindrical recess by a first distance and the second reference bore is offset from the central axis of the respective semi-cylindrical recess by a second distance that is different than the first distance, machining the two reference bores in each bearing support structure to match the spacing of the first and second reference bores in the respective bearing cap to which it is secured in use, fitting dowels in the first and second reference bores in the bearing support structures and the bearing caps, aligning and bringing into mating contact each bearing cap with the respective bearing support structure so as to produce full engagement of the dowels with the first and second reference bores in the bearing caps and bearing support structures, securing the bearing caps to the bearing support structures, and simultaneously line boring the semi-cylindrical recesses in the bearing support structures and bearing caps to produce a bore of a required diameter.

The method may further comprise removing the bearing caps from the bearing support structures after the line boring is complete, placing the shaft and associated bearings in position, replacing the bearing caps on the matching bearing support structures, and bolting the bearing caps to the bearing support structures.

Before the line boring, the semi-cylindrical recesses of the bearing support structures and bearing caps may each have a first diameter, whereas after the line boring, the semi-cylindrical recesses of the bearing support structures and bearing caps may each have a second diameter larger than the first diameter.

Machining each reference bore of the bearing support structures may comprise machining a chamfered lead-in at a mounting face end thereof, and machining each reference bore of the bearing caps may comprise machining a chamfered lead-in at a mounting face end thereof. Further, the dowels may comprise chamfers.

Each bearing cap may further comprise first and second bolt clearance holes in a first foot thereof and third and fourth bolt clearance holes in a second foot thereof. In such examples, machining the first and second reference bores in each bearing cap may comprise machining the first reference bore at an offset from each of the first and second bolt clearance holes and machining the second reference bore at an offset from each of the third and fourth bolt clearance holes.

BRIEF DESCRIPTION OF THE DRAWINGS

The invention will now be described by way of example with reference to the accompanying drawing of which:

FIG. 10b is a cross-sectional view on the line V-V on FIG. 10a.

DETAILED DESCRIPTION

Figure 1A:
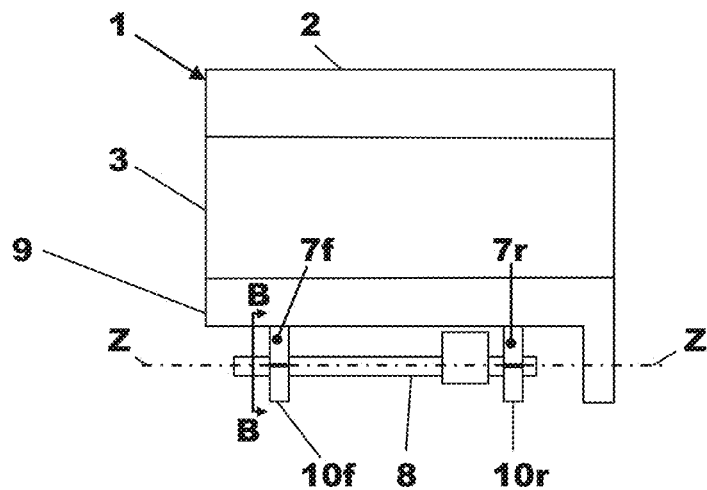
FIG. 1a is a side view of an engine in accordance with the second aspect of the invention having a shaft assembly constructed in accordance with the third aspect of the invention, the shaft assembly having two bearing caps constructed in accordance with the first aspect of the invention.

With particular reference to FIGS. 1a, 1b, 2 and 3 there is shown an engine 1 having a cylinder head 2, a cylinder block 3 and a ladderframe 9 bolted to a lower end of the cylinder block 3. The ladderframe 9 defines at a lower end front and rear bearing support structures 7f, 7r to each of which a respective Poka-Yoke bearing cap 10f, 10r is bolted by means of a pair of bolts 25. A front bearing cap 10f is bolted to the front bearing support structure 7f and a rear bearing cap 10r is bolted to the rear bearing support structure 7r.

A shaft 8, which in the case of this example is an engine balancer shaft, is rotatably supported by the front and rear bearing caps 10f and 10r and the front and rear bearing support structures 7f and 7r to form a shaft and bearing assembly. The shaft 8 is rotatably supported for rotation about an axis of rotation Z-Z by in the case of this example two bearing support assemblies 7f, 10f and 7r, 10r. However, it will be appreciated that the invention is not limited to the use of two bearing support assemblies and that there could be more bearing support assemblies than the two provided by way of this example.

The shaft 8 has a drive gear fastened to a front end of the shaft 8 for use in driveably connecting the shaft 8 to a crankshaft of the engine 1.

Each bearing support assembly therefore comprises of one bearing support structure 7f, 7r and a respective bearing cap 10f, 10r bolted thereto.

Figure 1B:
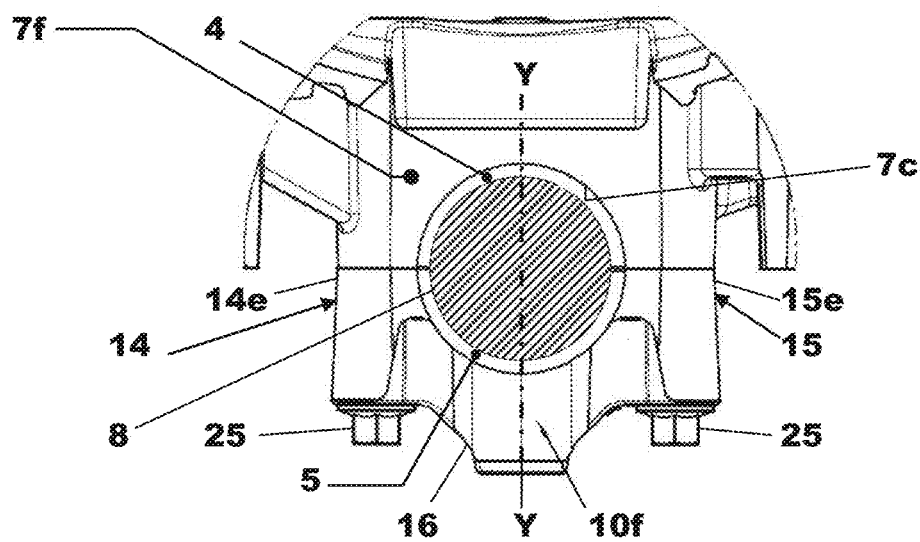
FIG. 1b is an enlarged view on the line B-B on FIG. 1a in the direction of the arrows.
Figure 9:
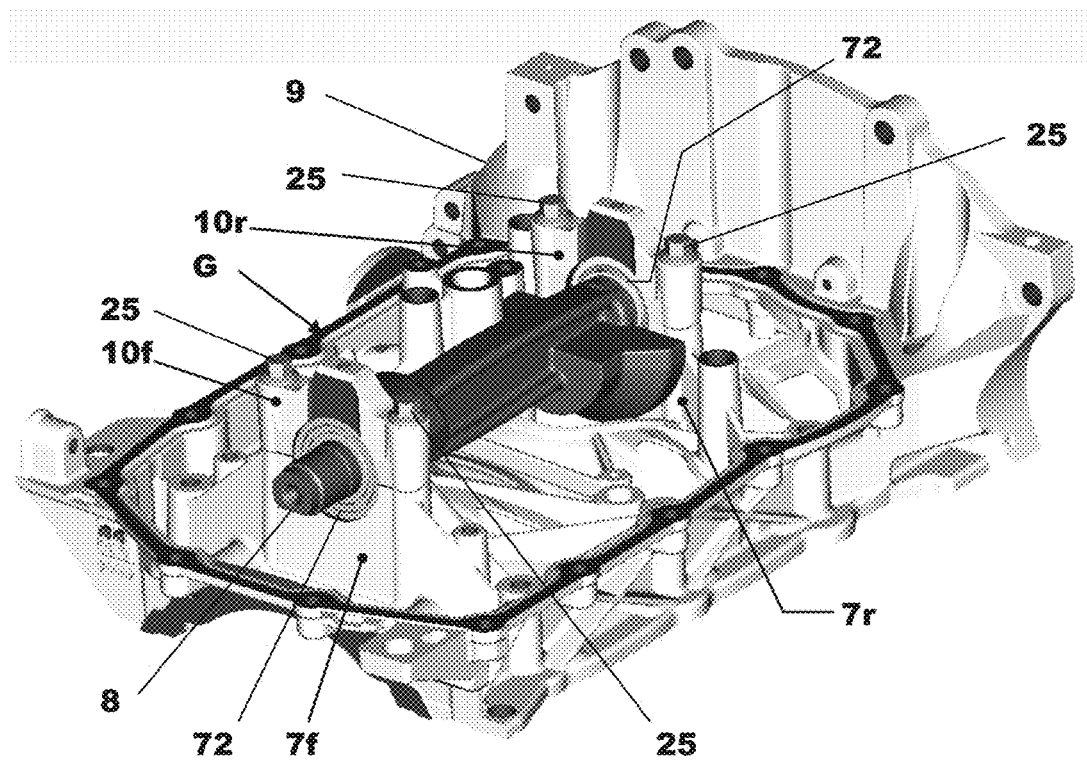
FIG. 9 shows a fully assembled balancer shaft assembly according to the invention.

A bearing assembly is formed by a bearing support assembly 7f, 10f; 7r, 10r and a respective bearing which in the case of the embodiment shown in FIG. 1b is a plain bearing formed by first and second bearing shells 4, 5 and in the case of the embodiment shown in FIG. 9 is a roller bearing 72.

The two bearing support structures 7f, 7r are in terms of construction substantially the same and their general arrangement will be described hereinafter with reference to the front bearing support structure 7f. It will be appreciated that the construction and general arrangement of the rear bearing support structure 7r will be substantially the same as that described with respect to the front bearing support structure 7f.

The two bearing caps 10f, 10r are in terms of construction substantially the same and their general arrangement will be described hereinafter with reference to the front bearing cap 10f. It will be appreciated that the construction and general arrangement of the rear bearing cap 10r will be substantially the same as that described with respect to the front bearing cap 10f.

The front bearing support structure 7f defines a substantially semi-cylindrical recess 7c of radius r' in which is located one first bearing shell 4.

The front bearing cap 10f defines a substantially semi-cylindrical recess 12 of radius r in which is located one second bearing shell 5. The second bearing shell 5 forms in combination with the first bearing shell 4 a rotary support for the shaft 8.

Figure 2:
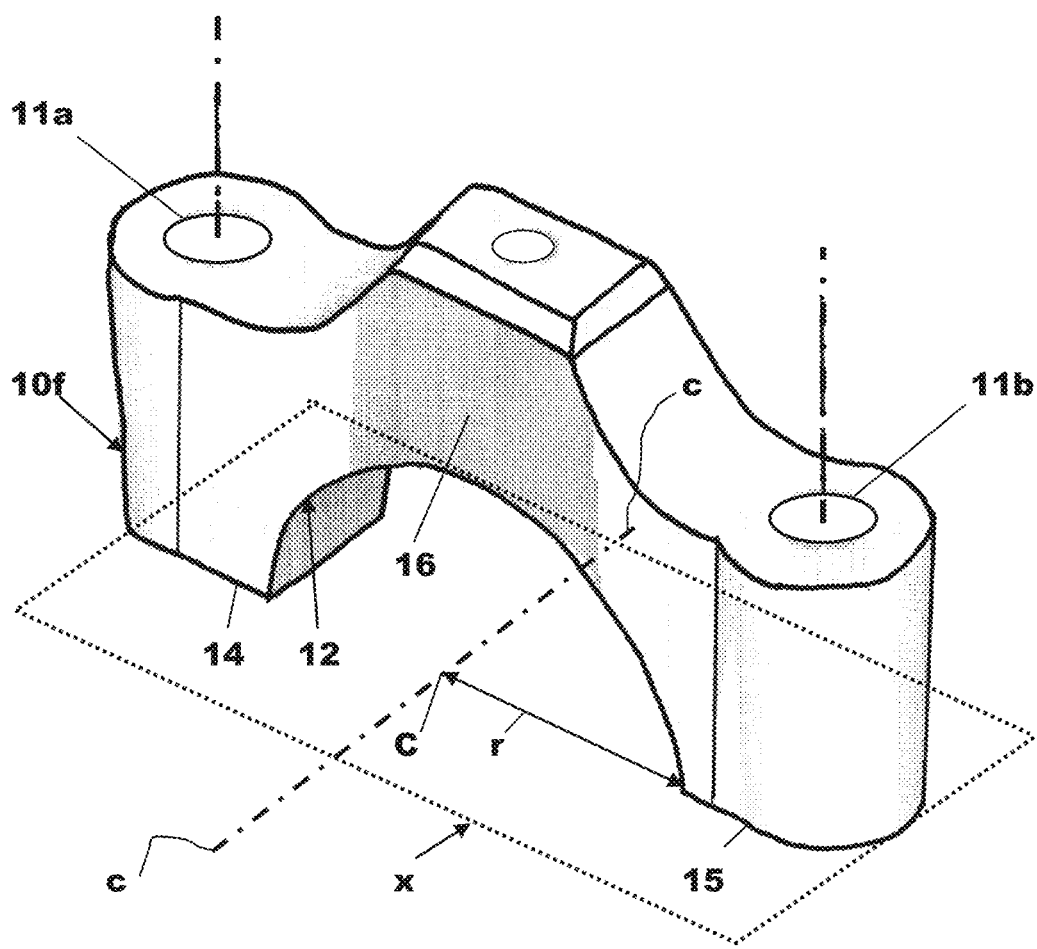
FIG. 2 is a pictorial view of a bearing cap in accordance with the first aspect of the invention.

The front bearing cap 10f comprises a bridge portion 16 joining first and second feet 14 and 15 having mating surfaces located on a common plane x (See FIG. 2). The semi-cylindrical recess 12 is formed in the bridge portion 16 of the bearing cap 10f between the two feet 14, 15 so as to support the shaft 8 in such a manner that, in use, the axis of rotation Z-Z of the shaft 8 is arranged coincident with a central axis c-c of the cylindrical recess 12 in the bearing cap 10f used to support the shaft 8. The central axis c-c is positioned at a centre of radius C of the semi-cylindrical recess 12 (See FIGS. 2 to 5).

The axis of rotation Z-Z of the shaft 8 is, in use, also arranged to be coincident with a centre of radius C' of the semi-cylindrical recess 7c in the bearing support structure 7f. The centre of radius C' lies on a central axis of the semi-cylindrical recess 7c.

A plane Y-Y extends through the centre of radius C of the semi-cylindrical recess 12 in the bearing cap 10f, the plane Y-Y is arranged at ninety degrees to the common plane x. The plane x is shown pictorially on FIG. 2 by a dotted line and is indicated by a chain dotted line X-X on FIGS. 3 to 5.

In the example shown, the plane Y-Y is not centrally located with respect to respective outer edges 14e, 15e of the two feet 14, 15. That is to say, the outer edges 14e, 15e of the two feet 14, 15 are not symmetrically arranged with respect to the centre of radius C of the semi-cylindrical recess 12. However, it will be appreciated that the outer edges 14e, 15e of the two feet 14, 15 could be symmetrically arranged with respect to the axis Y-Y if required because the outer edges 14e, 15e of the feet 14, 15 are not used in the case of this invention to position the bearing cap 10f.

The first foot 14 has a first clearance bolt hole 11a extending therethrough and the second foot 15 has a second clearance bolt hole 11b extending therethrough.

In use a bolt 25 is engaged with clearance in the first clearance bolt hole 11a for threaded engagement with a respective threaded bore 7t formed in the bearing support member 7f and a bolt 25 is engaged with clearance in the second clearance bolt hole 11b for threaded engagement with a respective threaded bore 7t formed in the front bearing support member 7f, the two bolts 25 are used to fasten the bearing cap 10f to the bearing support member 7f.

The front bearing support member 7f has first and second reference bores 7d, 7e formed therein. The two reference bores 7d, 7e are accurately sized and accurately positioned and are provided for use in correctly aligning the front bearing cap 10f with the front bearing support structure 7f.

The reference bores 7d, 7e are in the case of this example coaxially aligned with the two threaded bores 7t and are of a larger diameter than the threaded bores 7t. However, it will be appreciated that the reference bores and the threaded bores could be offset with respect to one another.

The first clearance bolt hole 11a in the front bearing cap 10f has a first reference bore 13a formed at one end that in the case of this example is coaxially aligned with it. The first reference bore 13a is formed in the mating surface of the first foot 14 and has a longitudinal central axis offset or spaced away from the central axis c-c of the semi-cylindrical recess 12 in the front bearing cap 10f by a first distance X1 as measured along the plane x.

The second clearance bolt hole 11b in the front bearing cap 10f has a second reference bore 13b formed at one end that in the case of this example is coaxially aligned with it. The second reference bore 13b is formed in the mating surface of the second foot 15 and has a longitudinal central axis that is offset or spaced away from the central axis c-c of the semi-cylindrical recess 12 in the front bearing cap 10f by a second distance X2 as measured along the plane x.

The two reference bores 13a, 13b are accurately sized and accurately positioned and are provided for use in correctly aligning the front bearing cap 10f with the front bearing support structure 7f.

The first and second reference bores 13a, and 13b are of a larger diameter than the first and second bolt clearance holes 11a, 11b so that the first clearance hole 11a and the first reference bore 13a form a first stepped bore and the second clearance hole 11b and the second reference bore 13b form a second stepped bore.

Figure 10A:
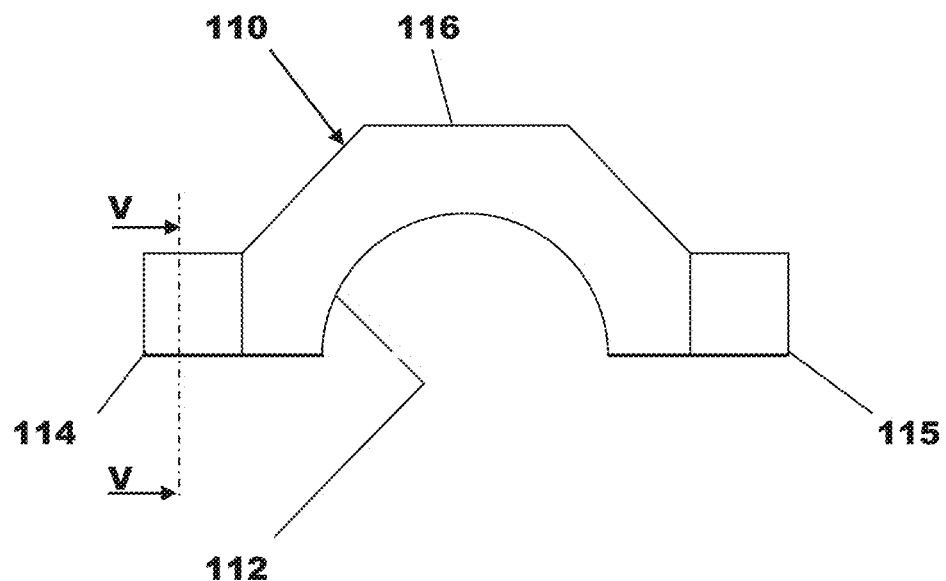
FIG. 10a is a side view of an alternative embodiment of bearing cap to that shown in FIG. 2.
Figure 10B:
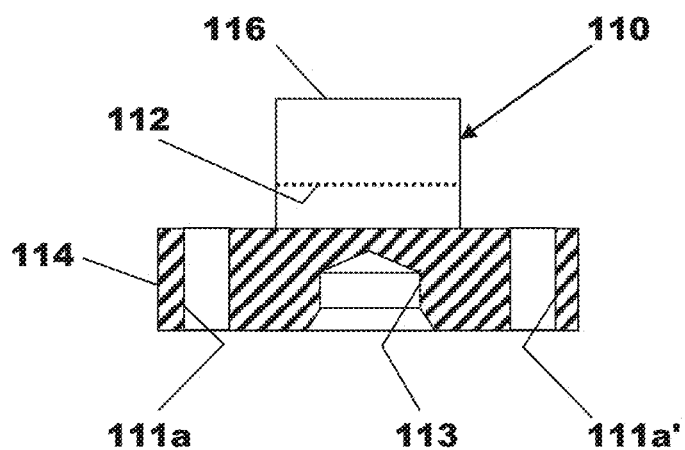

It will be appreciated that the two reference bores 13a, 13b need not necessarily be coaxially aligned with the clearance bolt holes 11a, 11b. FIGS. 10a and 10b show one example of such an offset arrangement.

In accordance with this invention the first and second distances X1 and X2 are never equal to one another and, in the case of this example, the first distance X1 is less than the second distance X2. In one exemplar use of the invention, the distance X1 was chosen to be 0.002 m (2 mm) less than the distance X2 therefore preventing assembly if the bearing cap 10f is offered up in a 'reversed orientation'. A 'reversed orientation' rotation of the bearing cap 10f is a rotation of the bearing cap 10f by 180 degrees about the axis Y-Y from its correct orientation. In order to prevent the bearing caps 10f, 10r from being positioned on the wrong bearing support structure 7f, 7r the centre spacing S between the reference bores 13a, 13b in the front bearing cap 10f is different to that used for the rear bearing cap 10r.

The centre spacing of the reference bores 13a, 13b is the sum of the offsets X1, X2 from the central axis c-c.

That is to say: S=X1+X2

By way of example and without limitation, Table 1 below provides an exemplary combination of offsets X1, X2 and centre spacings S for a pair of Poka-Yoke bearing caps in accordance with this invention.

TABLE 1

| Front Bearing Cap (10f) | | Rear Bearing Cap (10r) | |
|---|---|---|---|
| Offset X1 | 0.033 m | Offset X1 | 0.032 m |
| Offset X2 | 0.035 m | Offset X2 | 0.034 m |
| Centre Spacing S | 0.068 m | Centre Spacing S | 0.066 m |

It will be appreciated that the centre spacing of the two reference bores 7d, 7e in the bearing support structure 7f matches that used for the bearing cap 10f so that, in use, the first reference bore 7d in the bearing support structure 7f is offset the same distance from the axis of rotation Z-Z as the first reference bore 13a in the bearing cap 10f and the second reference bore 7e in the bearing support structure 7f is offset the same distance from the axis of rotation Z-Z as the second reference bore 13b in the bearing cap 10f.

All of the reference bores 7d, 7e, 13a and 13b are accurately machined and positioned and form along with the dowels 20 the primary location means for locating the bearing cap 10f with respect to the bearing support structure 7f.

To locate the bearing cap 10f with respect to the bearing support structure 7f, a dowel bushing 20 is first press fitted into each of the reference bores 7d, 7e in the bearing support structure 7f. The reference bores 13a, 13b in the bearing cap 10f are then offered up to and engaged with the dowel bushings 20. The bearing cap 10f is then pushed into place so that respective mating surfaces on the two feet 14, 15 of the bearing cap 10f abut against complementary end faces on the bearing support structure 7f Finally, two bolts 25 are inserted through the first and second clearance bolt holes 11a, 11b and are threadingly engaged with the threaded bores 7t in the bearing support structure 7f to hold the bearing cap 10f in position.

Prior to assembly of the bearing cap 10f to the bearing support structure 7f the bearing shells 4, 5 are positioned in the respective semi-circular recesses 7c, 12 and the shaft 8 is then positioned between the bearing shells 4, 5 in the support structure 7f and the bearing cap 10f respectively ready to be secured in position. The same assembly steps are used for the rear bearing cap 10r and the rear bearing support structure 7r.

Because the offset distances X1 and X2 of the first and second reference bores 13a, 13b respectively from the central axis c-c of the semi-cylindrical recess 12 are different it is not possible to assemble the bearing cap 10f to the bearing support structure 7f in a reversed orientation.

Also because the centre spacing S between the two reference bores 13a, 13b is different for each bearing cap 10f, 10r, the bearing cap 10f can only be located on the front bearing support structure 7f and the bearing cap 10r can only be located on the rear bearing support structure 7r.

Figure 3:
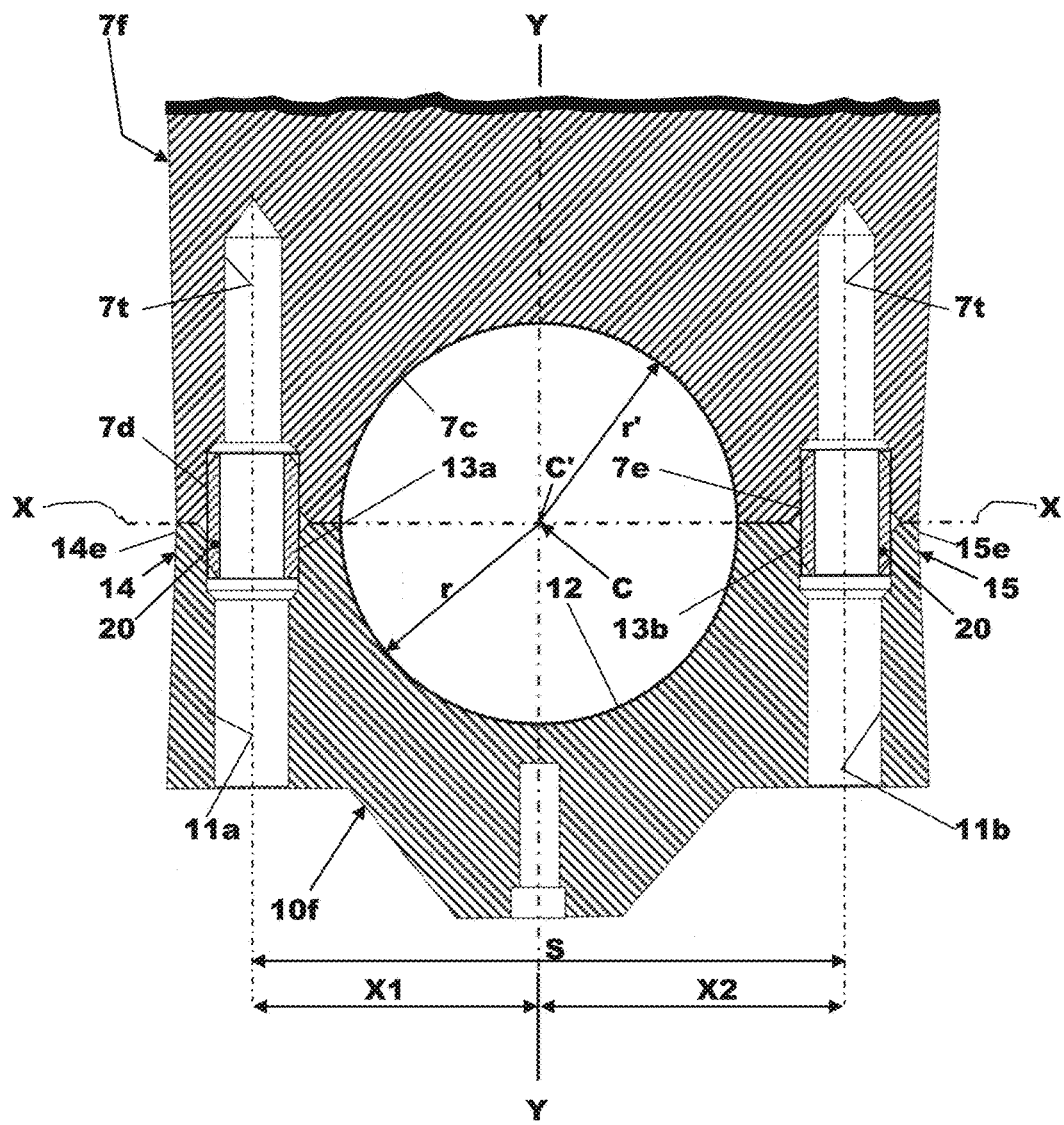
FIG. 3 is a cross-section on an enlarged scale through the bearing cap shown in FIG. 2 showing the bearing cap correctly positioned on a bearing support structure.
Figure 4:
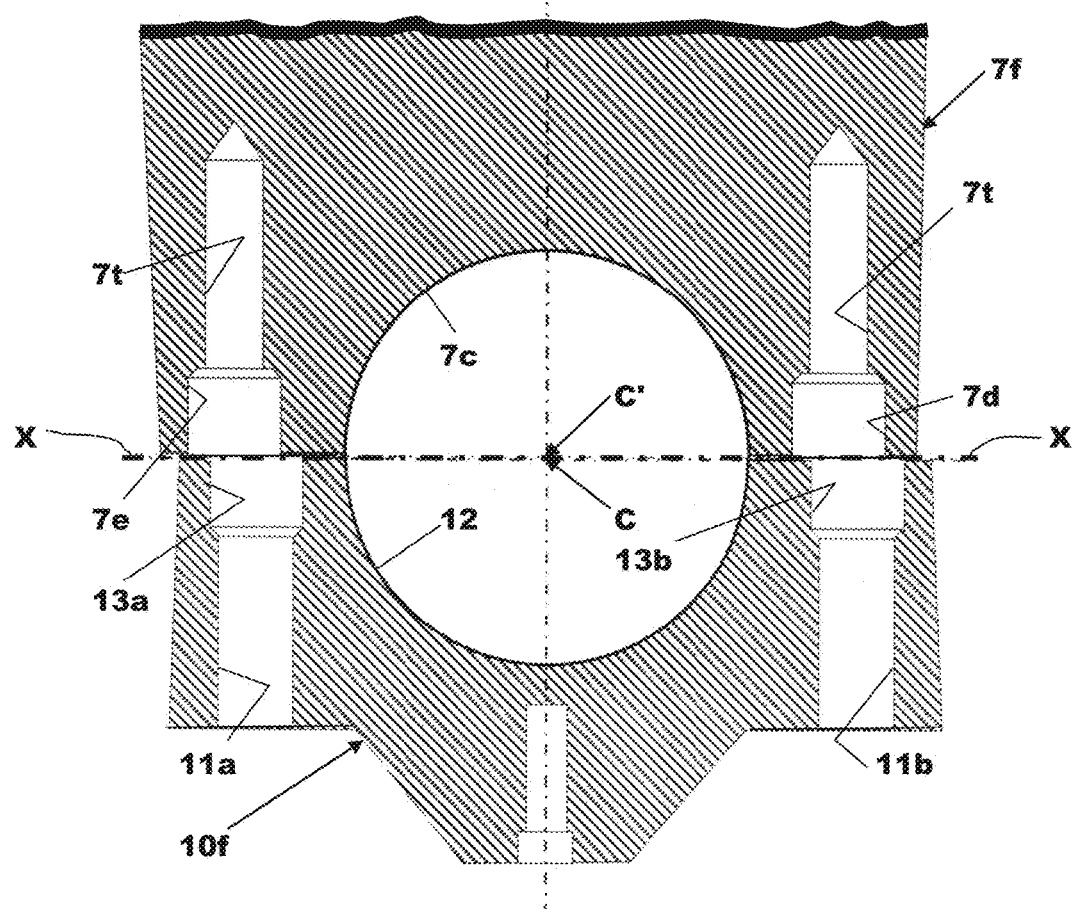
FIG. 4 is a cross-section similar to FIG. 3 but showing a first reversed misalignment condition of the bearing cap.

In FIG. 4 the bearing cap 10f has been reversed compared to its correct orientation shown in FIG. 3. In this case the semi-circular recess 12 in the bearing cap 10f has been aligned with the semi-circular recess 7c in the bearing support structure 7f, with the shaft 8 in position. Note that the two reference bores 13a, 13b in the bearing cap 10 are misaligned with the two reference bores 7d, 7e in the bearing support structure 7 so that it would not be possible to engage the dowel bushings 20 with the reference bores 13a, 13b in the bearing cap 10f if the bearing cap 10f were to be offered up in this orientation.

Figure 5:
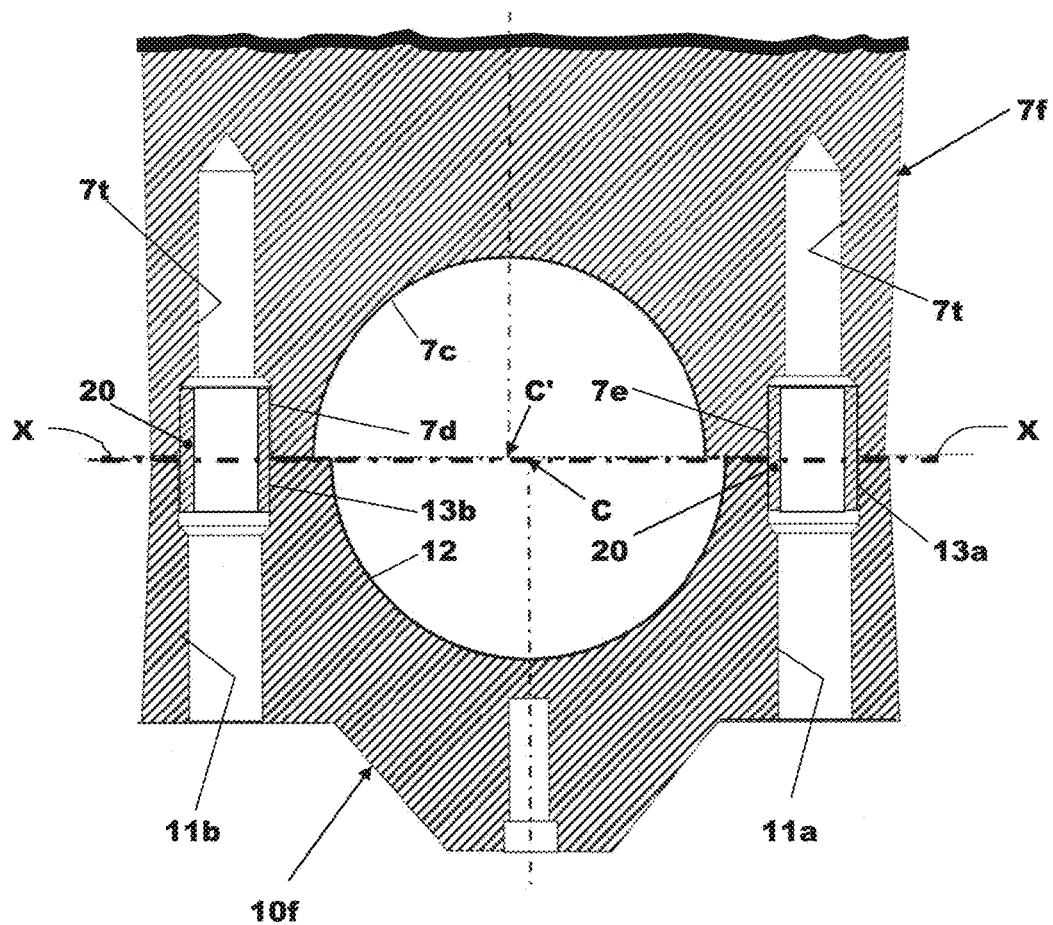
FIG. 5 is a cross-section similar to FIG. 3 but showing a second reversed misalignment condition of the bearing cap.
Figure 6:
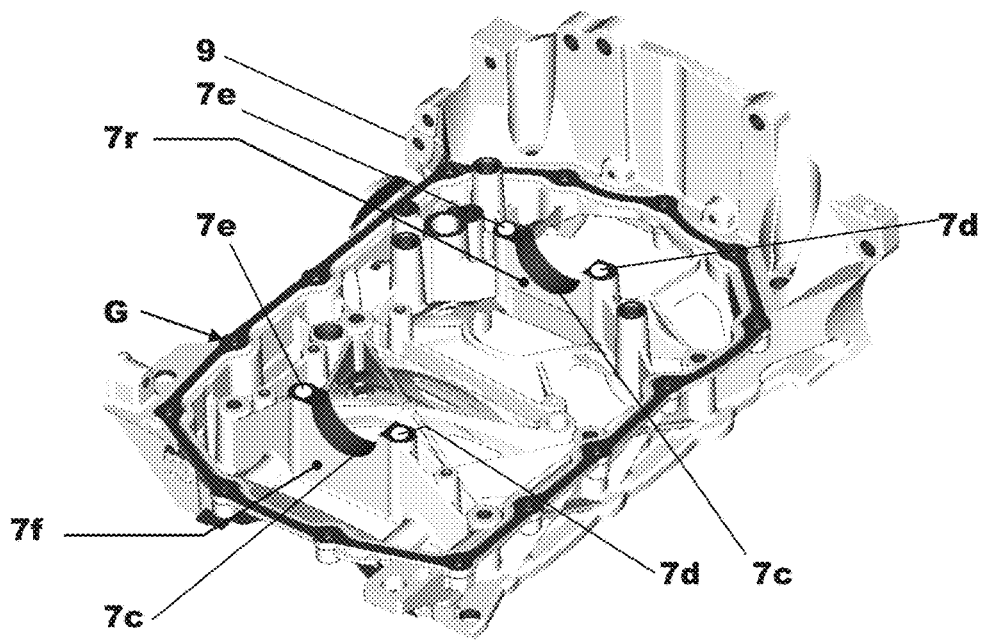
FIG. 6 is a pictorial view of a ladderframe defining a pair of bearing support structures showing the ladderframe in a partially machined state.
Figure 7:
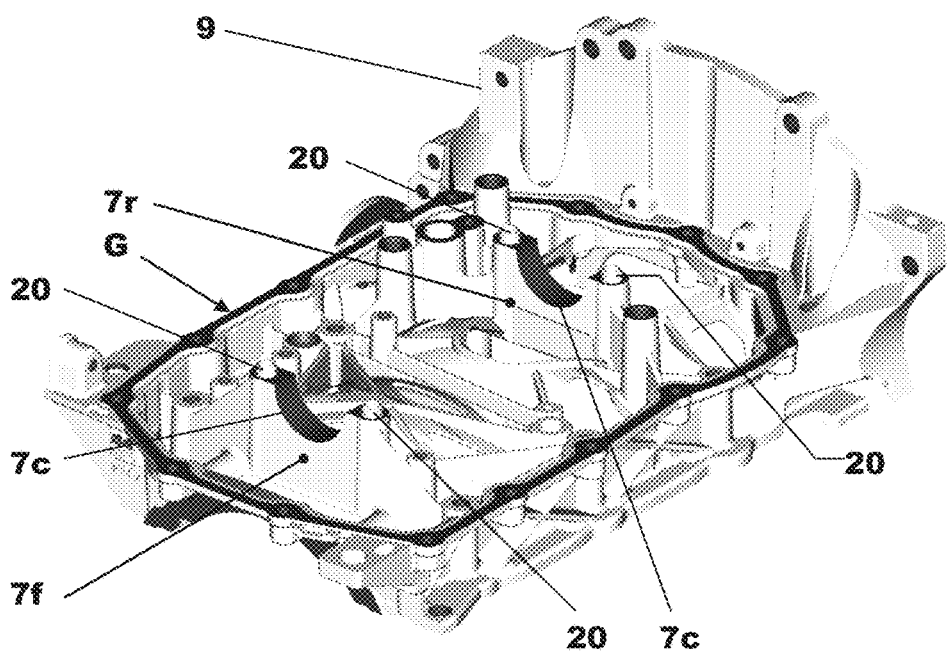
FIG. 7 is a pictorial view similar to FIG. 6 but showing the ladderframe after initial machining has taken place with location dowels in position to accept two bearing caps.
Figure 8:
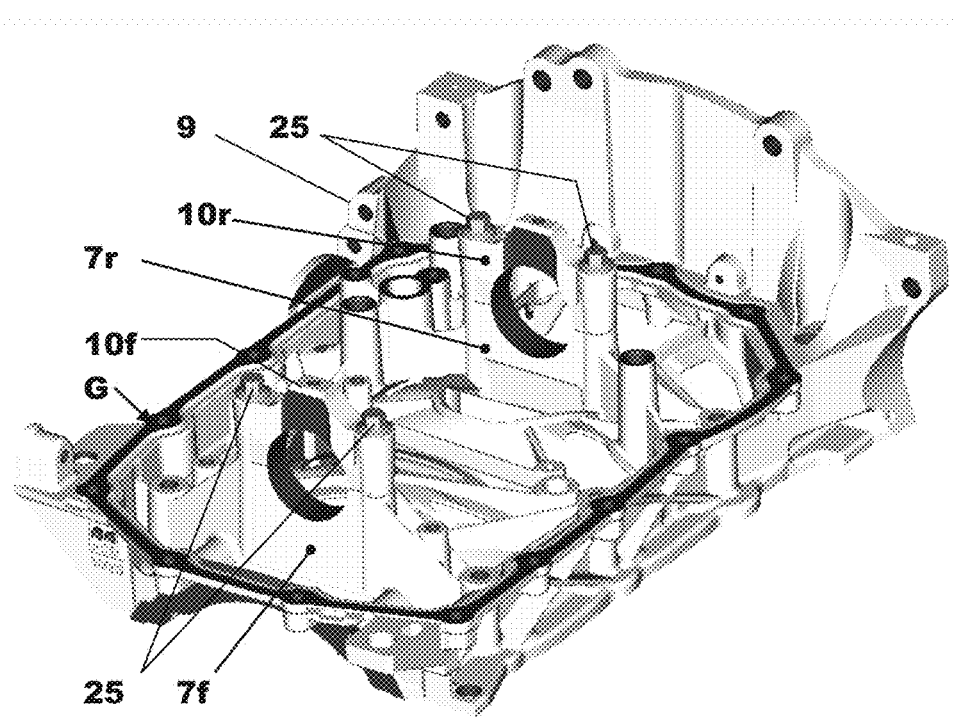
FIG. 8 is a pictorial view similar to FIGS. 6 and 7 showing two bearing caps in position on the bearing support structures ready for line boring.

In FIG. 5 the bearing cap 10f has also been reversed compared to its correct orientation shown in FIG. 3 but, in this case, the semi-circular recess 12 in the bearing cap 10f is misaligned with the semi-circular recess 7c in the bearing support structure 7f, an arrangement that can only be achieved if the shaft 8 is not in position. Note that the two reference bores 13a, 13b in the bearing cap 10f are in this case aligned with the two reference bores 7d, 7e in the bearing support structure 7f so that it would be possible to engage the dowel bushings 20 if it were not for inability to locate the bearing cap 10f on the shaft 8 due to the misalignment of the semi-circular recesses 7c, 12.

With reference to FIGS. 10a and 10b there is shown an alternative embodiment of a bearing cap to that shown in FIG. 2. The bearing cap 110 comprises a bridge portion 116 joining first and second feet 114 and 115 each of which has a mating surface located on a common plane. A semi-cylindrical recess 112 is formed in the bridge portion 116 of the bearing cap 110 between the two feet 114, 115 so as to support a shaft in such a manner that, in use, an axis of rotation of the shaft is arranged coincident with a central axis of the semi-cylindrical recess 112 in the bearing cap 110.

However, in the case of this embodiment each of the feet 114, 115 has two bolt clearance holes 111a, 111a' formed therein so that four bolts in total are used to secure the bearing cap 110 to a respective bearing support structure. Each of the feet 114, 115 has a reference bore 113 formed therein but in this case the reference bore 113 is not coaxially aligned with either of the bolt clearance holes 111a, 111a' but is offset with respect thereto. As with the embodiment shown and described with respect to FIG. 2 two dowels are used to provide alignment of the bearing cap 110 with the bearing support structure to which the bearing cap 110 is bolted in use. A dowel is located in each of the reference bores 113 in the bearing cap 110. The arrangement and spacing of the reference bores 113 is the same as that previously described with respect to FIG. 2 so that the bearing cap 110 can only be fitted in the correct orientation on the correct bearing support structure.

It will be appreciated that the invention is not limited to use with a balancer shaft and is particularly advantageous whenever the manufacturing process requires the assembly, disassembly and re-assembly of the bearing caps to the bearing support structures.

A method of producing a shaft and bearing assembly in accordance with the invention will now be described with reference to FIGS. 6 to 9 in which the ladderframe 9 is shown inverted to aid manufacture and assembly. In this orientation a gasket surface G of the ladderframe 9 faces upwards. The gasket surface G is used to sealingly connect an oil pan to the ladderframe 9 in use. The oil pan would be positioned so as to overlie the balancer shaft 8 at a bottom end of the engine 1.

The method commences with the manufacture of the primary components required to produce the shaft assembly. This requires manufacture of the shaft 8 using techniques well known in the art, bearings 72 for the shaft to be produced in a conventional manner, the casting of the ladderframe 9 and the production of in this case two bearing caps 10f, 10r.

The bearing caps 10f, 10r can be produced by any convenient method such as casting, sintering or machining from solid.

Whatever method is used to produce the ladderframe 9 and the bearing caps 10f, 10r they are all produced at this point in the manufacturing process in an unfinished state.

The ladderframe 9 then undergoes a number of further processes that include machining of the base ladderframe 9 to produce desired mating surfaces such as the gasket surface G, the machining of bearing cap mounting surfaces on the bearing support structures 7f, 7r, drilling and tapping of the mounting bolt holes 7t in the bearing support structures 7f, 7r and the drilling and reaming of two reference bores 7d, 7e per bearing support structure 7f, 7r at the required dimension and positions to accept at a later stage the dowels 20. Note that the reference bores 7d, 7e preferably include a chamfered lead-in (see FIG. 3) at the mounting face end to facilitate dowel insertion at the assembly stage.

The semi-cylindrical recesses 7c are at this stage intentionally left rough machined at a smaller diameter than that required for the final diameter.

The bearing caps 10f, 10r are also machined to produce the mounting surfaces on the two feet 14, 15, are drilled to produce the bolt clearance holes 11a, 11b and are drilled and reamed to produce the two reference bores 13a, 13b at the required dimensions and positions. As with the reference bores 7d, 7e the two reference bores 13a, 13b preferably include a chamfered lead-in (see FIG. 3) at the mounting face end to facilitate the insertion of the dowels 20 at the assembly stage.

The semi-cylindrical recess 12 in each bearing cap 10f, 10r is intentionally left rough machined at a smaller diameter than that required for the final diameter.

When all of the basic machining operations are complete the dowels 20 are press fitted into the reference bores 7d, 7e in the two bearing support structures 7f, 7r of the ladderframe 9. The insertion of the dowels 20 into the reference bores 7d, 7e is facilitated by the presence of the chamfers (See FIG. 3) on the dowels 20 and the chamfers at the mounting surface ends of the reference bores 7d, 7e in the bearing support structures 7f, 7r.

The next stage is to assemble the bearing caps 10f, 10r onto the bearing support structures 7f, 7r of the ladderframe 9 so that the reference bores 13a, 13b engage with the pre-assembled dowels 20. The reference bores 13a, 13b are in this case push fit on the dowels 20. That is to say, the reference bores 13a, 13b for the dowels 20 are sized so that they provide good positioning but without requiring a large insertion force to be applied to the bearing caps 10f, 10r.

The insertion of the dowels 20 into the reference bores 13a, 13b in the bearing caps 10f, 10r is facilitated by the presence of chamfers (See FIG. 3) on the dowels 20 and at the mounting surface ends of the reference bores 13a, 13b in the bearing caps 10f, 10r.

It will be appreciated that due to the different offsets X1, X2 and centre spacings S used, the front bearing cap 10f can only be located on the dowels 20 in the front bearing support structure 7f and the rear bearing cap 10r can only be assembled onto the dowels 20 in rear bearing support structure 7r.

Although in this case of this example the dowels 20 are press fitted into the reference bores 7d, 7e and the bearing caps 10f, 10r are then push fitted to the already installed dowels 20 supported by the ladderframe 9 it will be appreciated that it would also be possible to press fit the dowels 20 to the bearing caps 10f, 10r and then push fit the dowels 20 into the reference bores 7d, 7e in the bearing support structures 7f, 7r.

Each of the bearing caps 10f, 10r is securely fastened in position by in this case two bolts 25. It will however be appreciated that more than two bolts could be used to secure each bearing cap in position.

After the bearing caps 10f, 10r have been securely fastened in position, final line boring of the semi-cylindrical recesses 7c, 12 takes place. The machining of all of the bearing support structures 7f, 7r and the bearing caps 10f, 10r is effected at the same time by a line boring operation so as to produce a bore dimension required to support, in the case of this example, the roller bearing 72.

The tolerance requirement for the bore formed by the combination of the semi-cylindrical recesses 7c, 12 in the bearing support structures 7f, 7r and the bearing caps 10f, 10r respectively is high and so the line boring may take place in several steps. Initial rough line boring is used to remove most of the unrequired material and then fine line boring is used to achieve the required tolerance. The use of fine line boring helps to achieve any specific geometrical tolerances required for the bearing support assembly.

After line boring is complete, the bolts 25 are removed and the bearing caps 10f, 10r are removed from the bearing support structures 7f, 7r.

In the case of this example the dowels 20 will remain in position in the bearing support structures 7f, 7r because they are press fitted into the reference bores 7d, 7e but only push fitted to the bearing caps 10f, 10r.

It will be appreciated that, if the dowels 20 were press fitted in the bearing caps 10f, 10r and push fitted to the bearing support structures 7f, 7r then the dowels 20 will be removed with the bearing caps 10f, 10r and will remain with the bearing caps 10f, 10r.

Assembly of the shaft 8 to the ladderframe 9 is as follows: a roller bearing 72 is positioned on each end of the shaft 8 and the shaft 8 is placed into position so that the roller bearings 72 lie in the semi-circular recesses 7c in the front and rear bearing support structures 7f and 7r.

In the case of this example, the shaft 8 is shown in FIG. 9 assembled to the ladderframe 9 prior to assembly of the ladderframe 9 to the cylinder block 3 of the engine 1. However, it will be appreciated that the ladderframe 9 could be assembled onto the cylinder block 3 of the engine 1 before the shaft 8 is assembled to the ladderframe 9.

After the shaft 8 along with its bearings 72 has been positioned on the bearing support structures 7f, 7r of the ladderframe 9, the bearing caps 10f, 10r are placed back in position. At this stage, the Poka-Yoke nature of the two bearing caps 10f, 10r becomes pre-eminent and any attempt to assemble the bearing caps 10f, 10r wrongly will lead to either a mismatch between the two semi-cylindrical recesses 7c, 12 or a mismatch between the dowels 20 and the reference bores 13a, 13b in the bearing caps 10f, 10r so that the bearing caps 10f, 10r cannot be repositioned incorrectly.

Two securing bolts 25 are then used for each bearing cap 10f, 10r to secure it in position on the respective bearing support structure 7f, 7r thereby completing the assembly of the shaft 8 to the ladderframe 9.

The Poka-Yoke arrangement of the bearing caps 10f, 10r and the bearing support structures 7f, 7r ensures that the bearing caps 10f, 10r cannot be re-assembled in either the wrong orientation or in the wrong position on the ladderframe 9. That is to say, the front bearing cap 10f can only be fitted to the front bearing support structure 7f and the rear bearing cap 10r can only be fitted to the rear bearing support structure 7r.

Although the invention has been described herein with reference to its use for a balancer shaft it will be appreciated that it could be used with advantage for other types of shaft which have multiple bearings such as, for example and without limitation, main bearings for a crankshaft, support bearings for a camshaft, support bearings for a rotary shaft of a gearbox.

It will also be appreciated that the invention is not limited to use with a rotating shaft using roller bearings; the invention can be applied with advantage to shafts using plain bearings or where the bearing caps and the bearing support structures form the bearings for a shaft so that no additional bearings are required.

'Poka-Yoke' as meant herein is an arrangement that prevents the incorrect assembly of components.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. A method of producing a shaft assembly, comprising:
   manufacturing a shaft;
   manufacturing a component having at least two bearing support structures each of which has a semi-cylindrical recess, first and second reference bores, and two or more threaded bores;
   manufacturing a like number of bearing caps as there are bearing support structures, each of the bearing caps having a semi-cylindrical recess, first and second reference bores, and two or more bolt clearance holes,
   wherein the method further comprises machining the two reference bores in each bearing cap so that the first reference bore is offset from a central axis of the respective semi-cylindrical recess by a first distance and the second reference bore is offset from the central axis of the respective semi-cylindrical recess by a second distance that is different than the first distance, machining the two reference bores in each bearing support structure to match the spacing of the first and second reference bores in the respective bearing cap to which it is secured in use, fitting dowels in the first and second reference bores in the bearing support structures and the bearing caps, aligning and bringing into mating contact each bearing cap with the respective bearing support structure so as to produce full engagement of the dowels with the first and second reference bores in the bearing caps and bearing support structures, securing the bearing caps to the bearing support structures, and simultaneously line boring the semi-cylindrical recesses in the bearing support structures and bearing caps to produce a bore of a required diameter.

2. The method as claimed in claim 1, wherein the method further comprises removing the bearing caps from the bearing support structures after the line boring is complete, placing the shaft and associated bearings in position, replacing the bearing caps on the matching bearing support structures, and bolting the bearing caps to the bearing support structures.

3. The method as claimed in claim 1, wherein before the line boring, the semi-cylindrical recesses of the bearing support structures and bearing caps each have a first diameter, and wherein after the line boring, the semi-cylindrical recesses of the bearing support structures and the bearing caps each have a second diameter larger than the first diameter.

4. The method as claimed in claim 1, wherein machining each reference bore of the bearing support structures comprises machining a chamfered lead-in at a mounting face end thereof, wherein machining each reference bore of the bearing caps comprises machining a chamfered lead-in at a mounting face end thereof, and wherein the dowels comprise chamfers.

5. The method as claimed in claim 1, wherein each bearing cap comprises first and second bolt clearance holes in a first foot thereof and third and fourth bolt clearance holes in a second foot thereof, and wherein machining the first and second reference bores in each bearing cap further comprises machining the first reference bore at an offset from each of the first and second bolt clearance holes and machining the second reference bore at an offset from each of the third and fourth bolt clearance holes.

* * * * *